United States Patent [19]
Hendrickson et al.

[11] Patent Number: 5,962,082
[45] Date of Patent: Oct. 5, 1999

[54] PROCESS FOR APPLYING LIQUID COATINGS TO SOLID PARTICULATE SUBSTRATES

[75] Inventors: William A. Hendrickson, Stillwater; James Abbott, St. Paul, both of Minn.

[73] Assignee: Aveka, Inc., Woodbury, Minn.

[21] Appl. No.: 08/916,753

[22] Filed: Aug. 19, 1997

[51] Int. Cl.$^6$ .................................................... H01F 1/00
[52] U.S. Cl. ...................... 427/547; 427/127; 427/213; 427/598
[58] Field of Search .................................. 427/213, 598, 427/547, 127

[56] References Cited

U.S. PATENT DOCUMENTS

| | | | |
|---|---|---|---|
| 3,848,363 | 11/1974 | Lovness et al. | 51/7 |
| 5,567,746 | 10/1996 | Gay | 523/220 |

OTHER PUBLICATIONS

Gelest, Inc. chemical catalog, pp. 216–217, 220–221, 231–233, 258–265, 287 (1996). (No month avail.).

"Chemicals for Research Scientists", General Catalog published by PCR Incorporated, Table of Contents, pp. 192–193, 198–199, (1994). (No month avail.).

Geldart, D., et al., "Assessing the Flowability of Powders Using Angle of Repose", *Powder Handling & Processing*, vol. 2, No. 4, pp. 341–346 (Nov. 1990).

Geldart, D., et al., "Techniques for Assessing the Flowability of Sodium Carbonate (soda ash)", *IMechE*, C418/011, pp. 41–48 (1991). (No month avail.).

Johanson, J.R., "Bulk Solids Flow Indices —A Simplified Evaluation System", Product Information published by JR Johanson, Inc., cover page, pp. 1–4, Tables 1–3, Figures 1–6 and Charts 1–6 (1991). (No month avail.).

Johanson, J.R., "The Johanson Indicizer System", Product Information, pp. 1–4 (Jan. 1, 1994).

*Primary Examiner*—Bernard Pianalto
*Attorney, Agent, or Firm*—Schwegman, Lundberg, Woessner & Kluth, P.A.

[57] ABSTRACT

The present invention provides a process for adhering a liquid to a particulate substrate. The process comprises the steps of:
  a) providing an apparatus which can create an oscillating magnetic field within a chamber,
  b) providing particulate magnetic material within the chamber of said apparatus while said oscillating field is active,
  c) having in the chamber within the oscillating magnetic field a liquid coating material and a particulate substrate to be coated with said liquid,
  d) and having said magnetic field form a fluidized bed of at least said particulate magnetic material, said liquid coating material coating the surface of the particulate substrate, and
  e) optionally continuously collecting the coated particulate substrate.

The particulate magnetic material may be added to the chamber before or after the magnetic field has been activated to oscillate. The field may be active when the magnetic particles are added, and the field may be activated only after the magnetic particles are present as a non-fluidized sedentary bed. The liquid may likewise be added at any time. The liquid coating material may be added before the field is activated, or after the field is activated. The liquid may be added before the magnetic particles are added, at the same time or after the magnetic particles are added. The magnetic particles may provide the only particulate surface onto which the liquid is to be coated, or separate particulates may be used along with the magnetic particulate materials. The magnetic particulates may be included along with the non-magnetic particulates in the final desired product, or the coated magnetic particles may be easily separated from the non-magnetic particles by magnetic filtering or screening. This process provides a significant benefit in a liquid coating process by reducing the potential for waste and allowing easy recycling of coating material.

40 Claims, 3 Drawing Sheets

5,962,082

PROCESS FOR APPLYING LIQUID COATINGS TO SOLID PARTICULATE SUBSTRATES

FIELD OF THE INVENTION

The present invention relates to a process for the application of liquids and the formation of liquid coatings on particulates by utilizing magnetic forces to fluidize particulate material in the presence of liquids within the fluidized bed. The forces relating to the movement of the magnetic particles and other particles within the magnetic bed help to evenly distribute the liquid onto the particle substrate.

BACKGROUND OF THE INVENTION

In many commercial processes and manufactured materials (e.g., catalysis, coating compositions, lubricants, medical treatment and cosmetic manufacture) it is desirable to use solid particles to carry liquids or to treat the surface of particles with liquids. Liquids have been traditionally applied by batch mixing of liquids and particles in a drum, and some amount of drying is also associated with such processes to reduce the total liquid content from that necessary to assure coating of all surfaces down to that amount actually necessary or desired on the coated particles. This methodology of liquid application is quite crude, does not provide assurance of equal coating quality on the particles, allows for or even causes significant agglomeration of particles, and, when drying is involved, requires liquid/solvent recovery techniques which tend to be expensive. Additionally, the conventional liquid coating and treatment process for particles alters the particle size distribution of the particles, either damaging the particles (and lowering average particle size) or causing particle agglomeration (which gives an apparent increase in average particle size).

Fluidized beds are systems in which volumes of solid particulates (called 'beds') are transformed into a fluid-like state by the forced passage of gas upwardly through the bed of particles. Once a sufficient velocity and volume of gas passes upward through the particle bed, the drag forces of the moving gas (with a positive vertical vector) at least equals the gravitational force (a negative vertical vector) on the individual particles. The particles then become supported in gas flow, giving the appearance of a liquid mass, being capable of adjusting to dimensional changes and the like. The mass of particles supported in a condition which mimics conventional fluids by the upward flow of gas is known as a fluidized bed. Fluidized beds or their equivalents are known to be generated by electrostatic fields on particles (e.g., electrostatic fluidized beds as have been described for use in electrostatic coating operations) and by magnetic fields applied to magnetic particles (e.g., U.S. Pat. No. 3,848,363, Lovness). U.S. patent application Ser. No. 08/518,640, filed on Aug. 25, 1995, also describes the use of this type of magnetic fluidization system to apply conventional fluidization size (100 microns or greater) solid particulates to other surfaces by fluidizing the magnetic particles and having them impact surfaces introduced into the magnetically fluidized bed, the impact of the fluidized solid particles embedding or otherwise adhering the fluidized particles to the introduced surfaces. That Application describes the coating of only solid surfaces with solid coating materials (with coating materials such as aluminum oxide particles and phenolic powder applied to non-woven thermoplastic scouring material to increase the abrasiveness; magnetic coatings such as iron oxide can be applied to polymeric substrates such as polyester films to provide magnetic recording media; and with high cost coating materials applied to low cost substrates to achieve desired properties with cost benefits. For example, pigments and reflective materials can be coated onto hollow glass spheres to provide desired optical qualities. Fragile reactive coatings such as chelating agents, e.g., algae, can be applied to substrates to achieve desired reactive materials. Precious metals such as gold, silver or platinum can be applied to substrates to achieve desired aesthetic effects.

SUMMARY OF THE INVENTION

The present invention provides a process for adhering a liquid to a particulate substrate, comprising the steps of:
a) providing an oscillating magnetic field,
b) providing particulate magnetic material within said oscillating field,
c) providing within the oscillating magnetic field a liquid coating material and a particulate substrate to be coated with said liquid,
d) and having said magnetic field form a fluidized bed of at least said particulate magnetic material,
e) having said liquid coating material coating the surface of the particulate substrate, and
e) optionally continuously collecting the coated particulate substrate.

The particulate substrate which is coated by the liquid may be only the particulate magnetic material used in forming the fluidized bed and/or may be a separate particulate material which is fluidized by the movement of the fluidized magnetic particles.

In the present invention, a fluidized bed of magnetic particles is formed. The fluidized bed may contain only the magnetic particles and the liquid coating material where the liquid coating material is desired to be applied to essentially only the magnetic particles. When the liquid coating material is desired to be applied to a particulate substrate or surface which is not magnetic in character, the substrate to be coated is provided into the magnetic particulate bed as a particulate, and the liquid coating material provides a liquid coating environment within the fluidized bed in the magnetic field. The liquid may be introduced into the magnetically fluidized bed either independently of the particulate substrate to be coated (e.g., added before, after or during fluidization of the magnetic particles, before, with or after any introduction of any non-magnetic particles to be coated, by spray, injection, dripping, carriage on other particles, and any other method of providing liquid into the chamber so that it may be contacted by moving particles and distributed throughout the coating chamber) or added with particulate materials (e.g., the particles, either magnetic or non-magnetic, may be pretreated or pre-coated with liquid and the fluidization process initiated or coated, or the liquid may be added simultaneously through the same or different inlet means). Pre-treated (pre-coated) magnetic particles may be provided as a pre-fluidized bed or added to a fluidized bed. Non-magnetic particles may be added to a pre-fluidized bed or added to a fluidized bed. All that needs to be done to accomplish liquid coating of particles within the bed is to assure that at some time during the fluidization of the bed, both the liquid to be coated and the particles which are desired to be coated are present within the fluidized system. The physical forces operating within the system will assure that the liquid is evenly spread over the particles if the particles and liquid are allowed to remain in the system for a reasonable time. The time during which the system equilibrates may range from a few seconds to minutes, partially dependent upon the viscosity of the liquid. The higher the viscosity of the liquid, the more time it takes for the liquid to be spread over the particles surfaces. This time factor can be readily determined by routine experimentation and can be estimated and correlated from the viscosity, particle sizes, relative wetting ability of the liquid for the particle surface and other readily observable characteristics of the system.

The process of the present invention is useful in providing liquid coatings which change the properties of the surface of the substrate such as by increasing surface lubricity of substrate particles to improve flowability, modify surfaces to improve corrosion or static resistance, enable bonding of the particles to other surfaces, and to provide particles with active ingredients carried on the surface of the particles. For example, medicinal ingredients may be carried on particulate materials, such as for example, anti-inflamatants on zinc oxide, heparin on silica, insect repellents on cornstarch, antibacterial agents on neutral solid carriers, insecticides on polymer beads, polymerizable monomers and oligomers on particulates (to form bonded particle sheets or to coat other surfaces with particles), coupling agents (such as ambifunctional or polyfunctional silanes, ambifunctional or polyfunctional epoxies, ambifunctional or polyfunctional acrylates) and the like.

Further, the process of the present invention can be environmentally friendly as no solvents are necessarily used in the coating process, and by proper proportioning of ingredients, there need be no liquid collection, recycling or removal during or after the process. Excess liquid carried on non-critical particles, especially where those non-critical particles may be easily sparated from the particles which are the primary object of the coating procedure, may be reused I subsequent processes so that waste may be reduced. The addition of non-critical particles to merely pick-up excess liquid is another available control feature of the present invention. For example, excess magnetic material, smaller or larger particles which can be readily physically separated from the primary particles, etc. may be added at any time during the process (e.g., before the primary particle addition, at the same time as the primary particle addition, or after the primary particle addition) to controll the amount of liquid deposited on the primary particles. These non-critical particles may be present, for example, as from 0.5 to 200% the weight of the primary particles. In fact, two different types of separable primary particles may be coated at the same time, and subsequently separated.

The process also provides a much more uniform size distribution of particles, with less agglomeration than other liquid coating processes for particles. Even the natural state of agglomeration of commercially provided particles can be reduced when liquid coatings are applied to the commercial particles by the process of the present invention. The thickness of the liquid coatings can be controlled with surprising precision because of the equilibration forces acting within the process. By adding minute amounts of liquid incrementally, as light coatings on particles introduced into the system, extremely thin coating amounts may be provided.

DETAILED DESCRIPTION OF THE INVENTION

Figure 1:
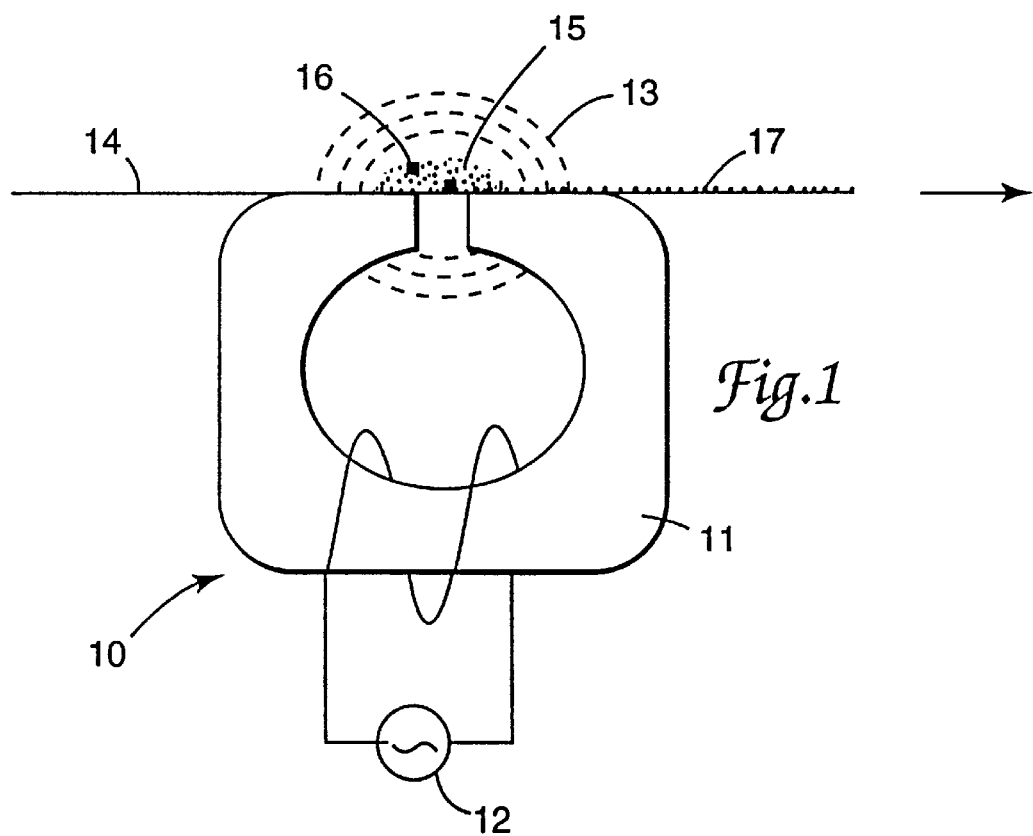
FIG. 1 is a side view of a coating system of the present invention.

The present invention provides a process for adhering a liquid to a particulate substrate. The process of the invention comprises at least the steps of:

a) providing an apparatus which can create an oscillating magnetic field within a chamber, b) providing within said chamber both a bed of particles which can be moved by said oscillating magnetic field and a liquid, and c) oscillating said magnetic field so that said bed of particles is fluidized and said liquid coats particles within said bed while said bed is fluidized.

The present invention also comprises a process having the steps of:

a) providing an apparatus which can create an oscillating magnetic field within a chamber, b) providing within said chamber both a bed of two different types of particles, at least one of said two types of particles being capable of being moved by said oscillating magnetic field and a liquid, and c) oscillating said magnetic field so that said bed of particles is fluidized and said liquid coats particles within said bed while said bed is fluidized.

The coating process may effectively coat both types of particles within the bed, and this is what usually occurs in the process. Where one particle has a surface which has been treated to be incompatible with the liquid (e.g., a highly hydrophilic coating or particle is used on the magnetic particles with strongly hydrophobic/oleophilic liquid), the liquid will preferentially coat the particle with which the liquid has the greater affinity, particularly where the particles which are desired to be coated and the liquid are highly compatible (e.g., both are hydrophilic/oleophobic or hydrophobic/oleophilic) while the other particle (e.g., the magnetic particle) are highly incompatible, The term particle or particulate as used in the practice of the present invention encompasses any discrete material in solid form which can be fluidized.

The process of the present invention also includes a process comprising the steps of:

a) providing an apparatus which can create an oscillating magnetic field within a chamber, b) providing particulate magnetic material within the chamber of said apparatus while said oscillating field is active, c) having in the chamber within the oscillating magnetic field a liquid coating material and a particulate substrate to be coated with said liquid, d) and having said magnetic field form a fluidized bed of at least said particulate magnetic material, said liquid coating material coating the surface of the particulate substrate, and e) optionally continuously collecting the coated particulate substrate.

The particulate magnetic material may be added to the chamber before or after the magnetic field has been activated to oscillate. The field may be active when the magnetic particles are added, and the field may be activated only after the magnetic particles are present as a non-fluidized sedentary bed or as the particles are being added through an inlet. The liquid may likewise be added at any time. The liquid coating material may be added before the field is activated, or after the field is activated. The liquid may be added before the magnetic particles are added, at the same time or after the magnetic particles are added. The magnetic particles may provide the only particulate surface onto which the liquid is to be coated, or separate particulates may be used along with the magnetic particulate materials. The magnetic particulates may be included along with the non-magnetic particulates in the final desired product, or the coated magnetic particles may be easily separated from the non-magnetic particles by magnetic filtering or screening. This process provides a significant benefit in a liquid coating process by reducing the potential for waste and allowing easy recycling of coating material. For example, when non-magnetic and magnetic particles are coated with a liquid, the magnetic particles and non-magnetic particles may the be separated by magnetic forces which separate the magnetic and non-magnetic particles. After the liquid coated magnetic material has been separated out, those liquid coated particles may be added back to the chamber within the apparatus, either before or after activation of the oscillating field, before or after addition of additional liquid coating material (for the same desired product), and/or before or after the addition of additional non-magnetic particles into the chamber. Because the magnetic particles do not use or decompose the liquid material, but in fact return liquid to the process environment, the is a high rate of coating liquid utilization in the process. Care should be exercised to assure that the liquid coating material does not deteriorate in any harmful fashion, as might be the case with medical ingredients or inhibiting agents.

Any liquid which is desired as a coating on a surface of a particle can be applied by the practice of the present invention. It may be desirable to assure that the liquid is capable of wetting or having some affinity for the particle to promote even distribution of the liquid on the surface of the particles, and this may be done by applying intermediate coatings or treatments to the particle surfaces. Such coatings or treatments could include coupling agents (e.g., di-functional or amphipathic materials that have affinity for two physically distinct materials because of different functional or property enhancing moieties on the coupling agent, such as both hydrophilic and hydrophobic groups on opposite ends of the compound or polar and non-polar groups on opposite ends of the molecule), physical treatments (e.g., oxidative or reductive treatments to alter surface properties, such treatments, for example, including, flame treatment, flash lamp exposure, excimer laser pulsing, corona discharge, and other energetic treatments of the particle surface which are known to alter surface properties), and combinations of physical and chemical procedures.

The liquids chosen as the coatings, as previously noted, may be any material which a user desires to coated upon the surface of a particle. A preferred class of coating comprises oxidizable silicon containing liquids such as compounds which comprise inorganic or more preferably metallic, metalloid or semimetallic ester containing groups such as MxOy (where M is the metal or metalloid atom, with the resultant oxide compound having x atoms for every y Oxygen atoms) and most preferably said liquid compounds being provided as silicon compounds such as silanes (e.g., $R_m Si[OR^1]_n$), that is compounds wherein R is an organic group (preferably bonded to the Si atom through a carbon atom), halogen or hydrogen, $R^1$ is H, or an organic group, such as alkyl, aryl or heterocycle, preferably alkyl of 1 to 4 carbon atoms, wherein R is 0, 1, 2 or 3 and n is 1, 2, 3 or 4; titanate counterparts of the silanes, such as $RmTi[OR^1]n$ in which R, $R^1$, m and n are as defined above; and any other oxidizable metallo or semimetallo compounds of the general forrnula $R_m M[R^1]_n$ wherein M is a metal or semimetal such as those selected from the group onsisting of Si, Ti, Zn, Ge, Al, Sn, Fe, Cu, Zr, B, Mg, Mn, W, Sb, Au, Ag, Cr, and the like, R and $R^1$ are as defined above, m plus n equals the valence state of M, and n must be at least 1. In addition to the preferred silanes, mainly preferred because of their ease of use and ready commercial availability, silicon compounds such as silazanes, siloxane cyclics, siloxane dimers, siloxane trimers, silane fluids, and tris-(alkoxysiloxy)-3-methacryloxyalkylsilanes (less preferred) may be used in the practice of the present invention.

In addition to these specific classes of compounds and metals/metalloids, and in addition to monometallic, monometalloid compounds as the starting materials, dimetallic (having two different metal/metalloid atoms, bimetallic (having two of the same metal/metalloid atoms in the compound), heterometallic (having one metal and one metalloid atom in the same compound), dimetalloid and bi-metalloid compounds, and mixtures of any of these groups of compounds are useful in the practice of the present invention. Mixtures and blends of the compounds provide unique capabilities for uniformly distributing different properties over a surface, or balancing (averaging) properties over the surface. An extremely wide range of these classes of oxidizable metal or metalloid compounds are commercially available, as exemplified by the lists of compounds in the 1996 Gelest, Inc. chemical catalog (e.g., pages 287 for a generic description of heterometallic and heterometalloid alkoxides, including alkali metal combinations; and especially pages 21–217; 220-221; 231–233; and 258–265) and the 1994 PCR, Incorporated General Catalog of "Chemicals for Research Scientists, especially pages 192-193 and 198-199). Germanium compounds have a functional similarity to silicon compounds in the practice of the present invention. A wide range of these compounds, as shown in the 1996 Gelest, Inc. catalog identified above, as shown particularly on pages 216-217.

Similarly, as indicated above, oxidizable tin compounds are another class of compounds useful equivalently to the silicon compounds preferred in the practice of the present invention. There are many commercially available alternatives within this class, as shown for example on pages 258–264 of the 1996 Gelest, Inc. chemical catalog. Examples of R (as shown in the silicon compound formula above, and equally applicable in corresponding groups attached to other metal or metalloid atoms in the oxidizable compounds of the present invention) are apparent to those of ordinary skill in the art and they may be functional (e.g., specifically reactive) groups or relatively non-reactive groups which may provide useful physical properties when the material is deposited on the surface prior to oxidation, or less likely, leave a residue which is advantageous after oxidation. Such R groups would include aliphatic and aromatic groups such as alkyl groups, alkyl ester groups, poly(oxyalkylene) groups, phenyl groups, naphthyl groups, H, hetero groups (e.g., thioethers), functionally terminated groups such a amino-alkyl, epoxy-alkyl, carboxyalkyl, even possibly halogen atoms such as I, Br, Cl and F (but these are much less preferred because of the halogen products, including halogenic acids) and the like. $R^1$ may be any oxidizable group such as an ester group, including those with their own functionality on the distal (from the position of attachment) end of the group. Such groups $R^1$ after attachment form ester or ester type groups so that $R^1$ is actually and aliphatic or aromatic group such as R, but is preferably limited to aliphatic groups of 1 to 20 carbon atoms, more preferably 1 to 10 carbon atoms, and most preferably 1 to 4 carbon atoms for aliphatic groups and 1 to 10 carbon atoms for aromatic groups. For silicon based compounds, representative examples are the silicone compounds described in U.S. Pat. No. 5,486,631, the reactive silanes of U.S. Pat. No. 4,084,021 and many other commercially available silicon compounds which may be oxidized, particularly at temperatures between 250 to 600° C., and more particularly at temperatures between 350 and 500° C.

The other classes of compounds include the counterparts of these compounds (i.e., with the silicon replaced by the other elements) such as titanate esters, zirconium esters, and other metal or non-metal esters. Mixtures of the various oxidizable compounds may be used, as suggested above, with particularly beneficial results, providing variations or mixtures of properties on surfaces, discontinuous areas of specific properties, blends (averages of properties), and the like.

A non-exhaustive list of compounds useful within the practice of the present invention includes such materials as: Isobutyltrimethoxysilane, Aminopropyltriethoxysilane, Aminopropyltriethoxysilane, 3-Methacryloxypropyl-trimethoxysilane, n-(2-Aminoethyl)-3-aminopropyltrimethoxysilane, 3-Glycidoxypropyltrimethoxysilance, n-Octyltriethoxysilane, Hexamethyldisilazane, Diethylsilane, Vinyldimethylchlorosilane, Vinylmethyldichlorosilane, Vinylmethyldimethoxysilane, Tetrakis[1-methoxy-2-propoxy]silane, Triethylchlorosilane, Vinylmethyldiethoxysilane, Vinyltrichlorosilane, Vinyltrimethoxysilane, Vinyltriethoxysilane, Dimethyldiethoxysilane, Hexamethyldisilazane, Divinyltetramethyldisilazane, Tetramethyldisilazane, Heptamethyldisilazane, Tris[(trifluoropropyl)methyl] cyclotrisiloxane, Methylvinylcyclotetrasiloxane, 1,3,5,7-Tetramethylcyclotetrasiloxane, 1,3,5,7,9-Pentamethylcyclopentasiloxane, Hexamethyldisiloxane, Divinyltetramethyldisiloxane, Divinyltetramethyldisiloxane (high Purity), Tetramethyldisiloxane, 1,3-Bis(3-aminopropyl)tetramethyldisiloxane, Heptamethyltrisiloxane, Chlorinated phenyl methyl polysiloxane, 1,3-Bis(aminopropyl)tetramethyldisiloxane, Bis(3-aminopropyl)polydimethylsiloxane, Bis(3-aminopropyl)polydimethylsiloxane, Diethoxy polydimethylsiloxane, Tris(trimethylsiloxy)3-methacryloxypropylsilane, Tetraisopropoxygermane, Tetrakis(Trimethylsiloxy-Germane, Tetramethoxygermane, Tetramethylgermane, Tetrapentylgermane, Tetraphenylgermane, Tetra-n-Propylgermane, Tetra-p-Tolylgermane, Triallylfluorogermane, Tri-n-Butylacetoxygermane, Tetraphenyltin, Tetravinyltin, Tetraphenyltin, Tetravinyltin, Tin II Acetate, Tin IV Acetate, Tin Acetylacetonate, Tin t-Butoxide, Tin II Chloride, anhydrous Tin II Chloride, Dihydrate Tin IV Chloride, anhydrous Tin II Ethoxide, Tin II Fluoride, Tetramethyltin, Tetra-n-Octyltin, Tetra-n-Pentyltin, Tetraethyltin, Tetraisopropoxytin-Isopropanol Adduct, Tetraisopropyltin, Tetrakis(Diethylamino)Tin, Tetrakis(Dimethylamino)Tin, Potasium Stannate trihydrate, Sodium Stannate trihydrate, Sodium Tin Ethoxide, Stannic Chloride, Tetraacetoxytin, Tetraallyltin, Tetra-t-Butoxytin, Tetra-n-Butyltin, Methacryloxytri-n-Butyltin, Methyltrichilorotin, Phenylethynyltri-n-Butyltin, Phenyltri-n-Butyltin, Phenyltrichlorotin, Divinyldi-n-Butyltin, 1-Ethoxyvinyltri-n-Butyltin, Ethynyltri-n-Butyltin, Hexabutyldistannoxane, Hex-n-Butylditin, Hexamethylditin, Dimethylhydroxy (Oleate)Tin, Dimethyltin Oxide, Dioctyldichlorotin, Dioctyldilauryltin, Dioctyldineodecanoatetin, Dioctyl (Maleate)Tin, Dioctyltin Oxide, Diphenyldichlorotin, Allytrichlorogermane, Allyltriethylgermane, Allytrimethylgermane, 3-Aminopropyltributylgermane, Ammonium Hexafluorogermanate, Ammonium Tris (Oxalato)Germanate, Benzyltricholorogermane, Bis[Bis (Trimethylsilyl)Amino]-Germanium II, Bis(Chloromethyl) Dimethylgermane, Bismuth Germanate, Bromomethyltribormogermane, Bromotrimethylgermane, Tetra-n-Butylgermane, Tetraethoxygermane, and Tetraethylgermane.

The substrates onto which the compositions of the invention may be deposited as coatings are essentially limited only by the ability of the substrate to be coated by the liquids (some amount of affinity is usually required, or to be resistant to any temperatures used in the oxidation process. Metal, metal oxide, inorganic oxides generally, glasses, ceramics, composites, pigments, lakes, catalysts, fillers, reflective particles, magnetic particles, radiation absorbing particles, flat surfaces, shaped surfaces, structural elements and the like may all take advantage of the compositions and process of the present invention. Because the composition of the invention may be readily controlled as to the thickness or continuity of the final coating, a wide range of other uses and properties may be provided. For example, by controlling the amount of liquid coating on the surface, the continuity of the liquid coating, the thickness of the liquid coating, and the like, similar attributes in the final materials may also be controlled. If the coated substrate were catalytic in nature, the degree of porosity or penetrability by any means (e.g., migration or diffusion) allowed in the liquid coating could control the degree of exposure of the catalyst. If the underlying substrate were highly hydrophobic, the specific degree of hydrophilicity/hydrophobicity of the product could be controlled by designing the specific percentage of the surface to be the exposed underlying material or the coating produced by the liquid coating process.

Any liquid material which an end user could wish to have coated on a particle is usable in the practice of the present invention. There are, of course, obvious physical limitations on what would be used, and such considerations would include the relative affinity of the liquid to the particle (as some affinity or wetting ability is desirable for a persistant coating) and highly volatile coating liquids would be unlikely to provide a durable product, since the liquid coating could readily evaporate. Under some conditions, even these types of coatings would be useful, as where the coated particles would be quickly used after coating in a manufacturing process, so that the low wetting ability coating would not retract off the surface and the high volatility coating would not evaporate off the surface until after the properties of the liquid coating were utilized. The coating compositions may be neat (pure) coatings of a single liquid, solutions, blends, mixtures, dispersions, emulsions, inert, reactive, interactive, organic, inorganic, or have any combination of properties that the user wants. The liquids may be polymerizable liquids (such as ethylenically unsaturated polymerizable compositions such as acrylates, methacrylates, acrylamides, methacrylamides, silicon monomers, silanes, epoxy resins and monomers, urethanes and polyurethanes, vinyl resins and monomers, thermally reactable solutions, radiation stimulable compositions, vapor stimulable compositions, etc.), medically active compositions (e.g., antifungal, antibiotic, biostatic, pesticidal, herbicidal, timed release, analgesic, diuretics, stimulants, and any other chemically moderated, controlled or treated activity), taggants (either chemical or physical), physical property modifying treatments (e.g., lubricating, antistatic, clarifying, odor adding or eliminating, surface roughening or smoothing, optical property modifying, viscosity modifying, hydrophilizing, hydrophobizing, polarity modifying, etc.). The active ingredient in the liquid coating does not have to be a liquid, but may be carried to the surface of the particle by the liquid and remain on the surface after removal of the liquid. For example, if antifungal medications were to be carried on a particle, a dispersion of the zinc or tin antifungal medication would be coated on the particle, the carrier liquid removed (dried) and the powder would remain on the surface in an active condition. Similarly, any other active powder could be applied from a liquid carrier to the surface of a particle. The particle may also be porous so that the liquid would penetrate into the pores of the particle, and if there were dissolved or dispersed material, that could be left in the pores after removal of the liquid or remain in the liquid within the pores if the liquid were not evaporated off the powder.

It is often understood in the compounding arts, that is those fields of technology where materials are formulated into related but different end products, that a significant amount of time has to be spent in reformulating compositions because of changes in non-functional ingredients. For example, in the cosmetic industry, the replacement of one pigment in a cosmetic composition by a different pigment may alter the physical properties of the final product and even render the formulation unsuitable because of those alterations in properties. These alterations are often due to the different chemical and/or physical properties (usually other than mere size differences) between pigments. Specifically the difference in hydrophobicity/hydrophilicity amongst different pigments may prevent the direct change of pigments in compositions which are otherwise expected to be substantially identical. For example, when a new lipstick base or eye shade base is created, each color must be individually formulated, not because of color effects, but because of chemical/physical interaction effects between the different colorants (such as the pigments) and the base. This adds significant cost to the introduction of new cosmetic compositions, without providing any specific merit within the minor variations in compositions which must often be effected to allow for different pigments to be used.

Substrates useful in the present invention can vary widely. Substrates can be fine particulates to coarse particulate materials such as grains, microcrystals, microbeads, whiskers, microspheres, microcapsules and the like, with dimensions of from 0.05 to 1000 micrometers. The configuration, i.e., upper limit as to shape and size of the particulate substrate is determined by the strength of the oscillating magnetic field that is generated and the size of the reaction vessel where one is used. Particulate substrates can be as small as 0.05 to 0.1 $\mu$m in diameter up to 1000 micrometers. The size of the particles selected is dependent upon the desired size of particles, not on the physical process, at least down to the 0.05 micrometer range. Ranges of 0.05 to 500, 0.05 to 250, 0.05 to 100, 0.075 to 100, 0.09 to 100, 0.10 to 100, and 0.075 to 50 are desirable ranges for specific processes and desired products.

The particulate substrates can be organic or inorganic materials, metals, ceramics, glasses, crystals, synthetic or natural organic polymeric materials, metal oxides, composites, natural organic materials, and the like. The particulates may include hard metallic materials, relatively soft materials such as polymeric beads, corn starch, epoxy powder and fabrics, hard fracturable materials such as solid glass beads and roofing granules, abrasive particles such as heat treated or fused aluminum oxide, silicon carbide, diamonds, precious or semi-precious gemstone, alumina, zirconia, silica, boron carbide, garnet, and combinations thereof, and fragile materials such as hollow glass spheres, aluminum and mica flakes, foams, and the like. Surprisingly, the process of the present invention can be adapted to coat the fragile substrates with virtually no breakage. Also the damage to the reaction vessel can be minimized even when the substrate is an abrasive material.

The surface character of the substrates can also vary from relatively smooth such as in hollow glass spheres and metal bearings to relatively complex surfaces as in microtextured carriers as may be used in cosmetics and medical applications.

Various coating materials can be applied to the particulate substrates to serve a variety of purposes. For example, substrate surfaces can be modified to change the character of the surface from high coefficients of friction to more slippery properties to improve those properties of the particulate material to improve handling of particles or film containing the particles during later processing. Liquid coating materials can be applied to substrates as protective barriers such as in the application of liquid polymerizable compounds onto metals or corrodable surfaces such as steel to prevent corrosion. Liquids such as polymerizable monomers (with or without suspended or dissolved material therewith), coupling agents, surface treatment agents (e.g., etchants, coupling agents, ambifunctional connectors, antistatic agents, surfactants, lubricants, aroma-active compounds (such as for cosmetic purposes, animal repellency to provide controlled release, herbicidal ingredients, pesticides, etc. Coupling agents, for example, are compounds such as ambifunctional silanes (e.g., epoxy-silanes, aminosilanes, acryloyl-functional silanes, such as gammaglycidoxytriethoxysilane, methacryloxypropyltrimethoxysilane, 3-aminopropyltrimethoxysilane and the like. Such compounds are generically dislcosed for example in U.S. Pat. No. 5,204,219. Equivalent titanate coupling agents (with titanate groups rather than silane groups) are also well known in the art and are commercially available.

High cost liquid coating materials can also be applied to low cost substrates to achieve desired properties with cost benefits. For example, medicines, repellents, lubricants, surface treatment agents, coupling agents, surfactants and other active or visible materials can be coated onto hollow glass spheres to provide desired qualities, including optical properties. Active liquid coatings such as chelating solutions, testing solutions (e.g., antibody testing solutions, DNA testing solutions, tracing agents, taggant solutions, radioactive solutions, etc.) can be applied to fragle particulate substrates to achieve desired active materials.

The process of the present invention can also reduce manufacturing costs and provide environmental benefits. The process of the present invention requires no solvents (although they may be used optionally as carriers for non-liquid materials to be deposited on the particulate materials) and is of benefit where solvent coating processes have typically been used as in applying coatings to thermoplastic polymeric materials. The ability to apply diverse materials out of liquid solutions (the solutions being the liquid coating material) is a clear advantage of the present inventions, as thin controlled coatings of the solutions may be applied to particle surfaces, the solvent carrier removed, and a thin, precise coating of the solute is left on the surface. Powder toner agents may be readily formed by this process by depositing liquid toners onto carrier particulate beads. Cobalt-doped magnetic iron oxide and resin can be coated onto polymeric sheets from stable dispersions in liquids to provide magnetic recording media.

The process of the present invention permits the use of particles much smaller than those typically used in fluidized bed processes. Generally, particles smaller than about 100 μm have been difficult to successfully fluidize, the attempts resulting in bubbling and other non-uniformities in the fluidized bed. In the present invention, a fluidized bed can be formed from coating material particles as small as 0.005 μm although coating material as large as 500, 600, 700 or 800 μm can be fluidized as well. Thus, a preferred range of magnetic and non-magnetic material particles of from about 0.005 μm to 500 μm can be used in the present invention. Typically, particles of both types in the range of about 0.5 to 100 μm are commonly used. The substrate particles are preferably at least 0.1 μm in diameter up to 25, 40, 50 75, 100, 250 or 500 micrometers.

The particles can be of any of a wide variety of shapes such as, for example, spherical, flake, cubic, polyhedral, tetrahedral, dodecahedral, filamentary, rectangular, disc shaped and irregular shapes. The powder may be in the form of loose agglomerates since such agglomerates are easily broken up by collisions in the magnetic field. The hardness of the non-magnetic particulate may vary over a broad range and is limited only that it should be hard enough to permit fluidization of the individual particles under in the presence of numerous collisions from magnetic elements.

The amount of liquid coating material used depends on the desired properties sought by addition of the liquid coating material and the desired coating thickness. The weight ratio of substrate to coating can range from about 500:1 to 1:20. For example, when coatings such as lubricants, antioxidants, medicines, repellents, antistatic agents and the like are coated on silicon carbide abrasive particles to improve flowability, the weight ratio of substrate to coating material is generally in the range of 100:1 to 100:2. When some particulates such as aluminum or mica flakes are coated with liquids, the weight ratio of substrate to liquid may be preferably in the range of about 20:1 to 1:20, more preferably about 5:1 to 1:5, and most preferably about 3:1 to 1:3. Those skilled in the art can readily determine the appropriate weight ratios of substrate to liquid coating material depending on the end use of the coated particles.

The liquid coating material is applied onto the substrate by the action of the magnetic material or non-magnetic material in a bipolar oscillating magnetic field which fluidizes the environment within which the liquid coating material is present. When the neither the coating material nor the second particulate substrate is magnetic, the bipolar oscillating magnetic field causes impingement of the magnetic elements into the liquid coating material which carries the liquid onto the non-magnetic particle substrate with a peening action. During such a process a certain amount of the liquid coating material coats the magnetic elements and the reaction chamber until a state of equilibrium is reached.

The magnetic field may be supplied with power by means of oscillators, oscillator/amplifier combinations, solid-state pulsating devices and motor generators. The magnetic field may also be provided by means of air core or laminated metal cores, stator devices or the like. The preferred magnetic field generator is provided by one or more motor stators, i.e., motors having the armatures removed, which are powered by an alternating current supply through transformers. In addition, metal strips may be placed outside the magnetic field generators to confine the magnetic fields to a specific volume of space.

A useful magnetic field is one with an intensity sufficient to cause desirable movement, but not enough to demagnetize the magnetic character of coating materials or magnetic elements that are moved by the oscillating magnetic fields. Preferably the magnetic fields have between about 100 oersteds and 3000 oersteds magnetic intensity, more preferably between about 200 and 2500 oersteds magnetic intensity.

The frequency of oscillations in the oscillating magnetic field affects the number of collisions that take place between the non-magnetic particulate that is moved in the magnetic field and surrounding particles that are fluidized, i.e., always kept in motion, by collisions with the moving magnetic elements. If the oscillation frequency is too high, the magnetic elements are unable to spin in the changing field due to the inertia of the elements. If the oscillation frequency is too low, residence time is increased until there is not enough movement in the magnetic elements to fluidize the particles. The oscillation in the magnetic field can be caused, for example, by using multiphase stators to create a rotating magnetic field, as disclosed in U.S. Pat. No. 3,848,363 (Lovness) which is incorporated herein by reference, or by using a single phase magnetic field generator with an AC power supply at a specified cycles per second to create a bipolar oscillating magnetic field. The frequency may be from 5 hertz to 1,000,000 hertz, preferably from 50 hertz to 1000 hertz, and more preferably at the hertz which is commonly used in AC power supplies , i.e., 50 hertz, 60 hertz, and 400 hertz. The bipolar magnetic field is preferred as the magnetic field generators used are generally less expensive and more available than those used to make rotating magnetic fields. The process may be performed as a batch process, with all ingredients present within a chamber, without continuous addition and/or removal of particles and/or liquid. The process may also be practiced as a continuous process, with the continuous introduction and removal of particles, liquid, and/or coated particles.

The magnetic powder or particles generally has a coercivity ranging from about 200 to 5000 oersteds and is of the type used in the recording and computer industries for audio, video, and data recording. The magnetic powder in the magnetic field should develop sufficient motion so as to fluidize itself as well as the particulate substrate. Such magnetic powders include, for example, gamma iron oxide ($Fe_2O_3$), an acicular particle about 4 μm long and 1 μm in diameter with a coercivity of about 300 oersteds, available from ISK Magnetics, Inc. cobalt doped gamma iron oxide ($Co—Fe_2O_3$), an acicular particle about 4 μm long and 1 μm in diameter with a coercivity of about 800 oersteds, available from ISK Magnetics, Inc., hard barium ferrite ($BaO.6 Fe_2O_3$), a platelet particle about 0.01 μm thick and 0.1 μm in diameter with a coercivity of about 3000 oersteds, available from Toda Kogyo Corp., Japan, and other magnetic powders such as AlNiCo, rare earth metals and ceramics.

Magnetic powders are generally desired to be as small as possible to permit thin coatings to occur and the shapes are determined by the manufacturing process used to make them. It is generally preferable to use as large a quantity of magnetic powder as will fluidize to achieve the shortest time for a desired coating thickness. In general, the magnetic powder can have a particle size from 0.05 μm to 10.0, 7.5 or 5.0 μm, preferably from 0.1 μm to 1.0, 2.0 or 3.0 μm, and more preferably from 0.1 μm to 0.4, 0.6 or 0.8 μm.

An aggregate of magnetic elements, each of which are individual minute permanent magnets can be used to fluidize the coating material and the substrate when particulate. Such magnetic elements generally have coercivities also ranging from 200 to 3000 oersteds. Suitable magnetic elements include, for example, gamma iron oxide, hard barium ferrite, particulate aluminum-nickel-cobalt alloys, or mixtures thereof. Magnetic elements can also comprise magnetic powder embedded in a polymeric matrix, such as barium ferrite embedded in sulfur cured nitrile rubber such as ground pieces of PLASTIFORM™ Bonded Magnets, available from Arnold Engineering Co., Norfolk, Nebr. In addition, the magnetic elements can be coated with polymeric materials, such as, for example, cured epoxy or polytetrafluoroethylene, to smooth the surface of the magnetic elements or make them more wear resistant.

Magnetic elements can range in size from less than the size of the particles to which liquid is being applied to over 1000 times the size of the non-magnetic particulate substrate being coated. If the magnet elements are too small, they can be difficult to separate from a liquid coated particulate substrate. Generally, the magnetic elements range in size from 0.005 $\mu$m to 1 cm. Strips of polymer embedded magnetic materials, with a length many times the size of a particulate substrate, are also sometimes useful for fluidizing sticky particulate polymeric substrates. In general, magnetic strips have a particle size of from about 0.05 mm to 500 mm, more preferably from about 0.2 mm to 100 mm, and most preferably from 1.0 mm to 25 mm. The appropriate size of the magnetic elements can be readily determined by those skilled in the art.

The quantity of magnetic elements that can be used in a magnetic field depends on residence time, type of coating, and ability of the moving magnetic elements to fluidize the non-magnetic particulate substrate if used. Preferably, only that quantity of magnetic elements needed to fluidize the non-magnetic particles in the coating zone. In general, the weight of the magnetic elements should be approximately equal to the weight of the non-magnetic particles in the magnetic field at a given time. A weight ratio of magnetic to non-magnetic particles of from 0.10 to 10 may be tolerated easily, however.

If the magnetic elements are too large, they may damage fragile or fracturable particulate substrates. For example, when hollow glass bubbles having an outer diameter of 20 $\mu$m and a wall thickness of 1 $\mu$m are to be coated in the presence of magnetic elements where the magnetic material is in a polymeric base such as those prepared by grinding PLASTIFORM™ magnetic material to form magnetic elements of various sizes, those elements which pass through a No. 30 mesh screen but not through a No. 45 mesh screen will generally fracture a portion of the hollow glass bubbles if the magnetic field intensity is sufficient to fluidize the bubbles. However, magnetic elements which pass through a No. 80 mesh screen but not through a No. 120 mesh screen will not cause fracturing of the glass bubbles.

Chambers useful in the present invention can be of a variety of non-metallic materials such as flint glass; tempered glass, e.g., PYREX™ glass; synthetic organic plastic materials such as polytetrafluoroethylene, polyethylene, polypropylene, polycarbonate and nylon; and ceramic materials. Metallic materials can be used but in use eddy currents can occur which would negatively affect the oscillating magnetic field and increased power would be required to overcome these effects. The lining of the chamber should also be selected so that the coating liquid does not harm the lining. Solvents, if any, in the liquid coating materials should not be used if they dissolve or weaken the lining.

The thickness of the chamber wall should be sufficient to withstand the collisions of the magnetic elements and depends on the materials used. Appropriate thickness can readily be determined by those skilled in the art. When polycarbonate is used to form the chamber, a suitable wall thickness can be from 0.1 mm to 25 mm, preferably from 1 mm to 5 mm, more preferably from 1 mm to 3 mm.

The shape of the chamber can be cylindrical, spherical, polyhedral or irregular since the magnetic field will fill any shape and fluidize the powder within the chamber. The chamber can be of any orientation, such as, for example, vertical, horizontal, angular, or corkscrew.

The process of the invention will now be further explained with regard to the various coating apparatus shown in the drawings.

FIG. 1 shows coating device for applying liquid coating materials to particles. The device 10 includes C-frame motor stator 11 which is driven by alternating current power supply 12 which provides a magnetic field represented by magnetic field lines 13. Moving substrate 14 which is placed in close proximity to stator 11 such that substrate 14 is within the magnetic field. For reasons of simplicity of operation, the substrate can run indirect contact with the stator or, if desired, can be held as much as 10 mm distant from the stator by means of spacers or delivery control means. When the liquid coating material is not to be deposited primarily upon the magnetic particles, non-magnetic particles 15 and magnetic elements 16 are also introduced into the magnetic field and coating material 15. Liquid coating material may be present on either or both the magnetic or non-magnetic particles when they are originally introduced into the chamber, or may be added through a vent or spray device (not shown) at any time before, during or after introduction of either or both of the particles.

The magnetic material is preferably metered into the oscillating magnetic field by a powder conveying device, such as, for example, a Model H20/DDS/20/20 Loss-In-Weight Screw Feeder, available from Brabender, Duisberg, Germany, and a vibratory feeder, available from FMC Corp., Homer City, Pa.

Figure 2:
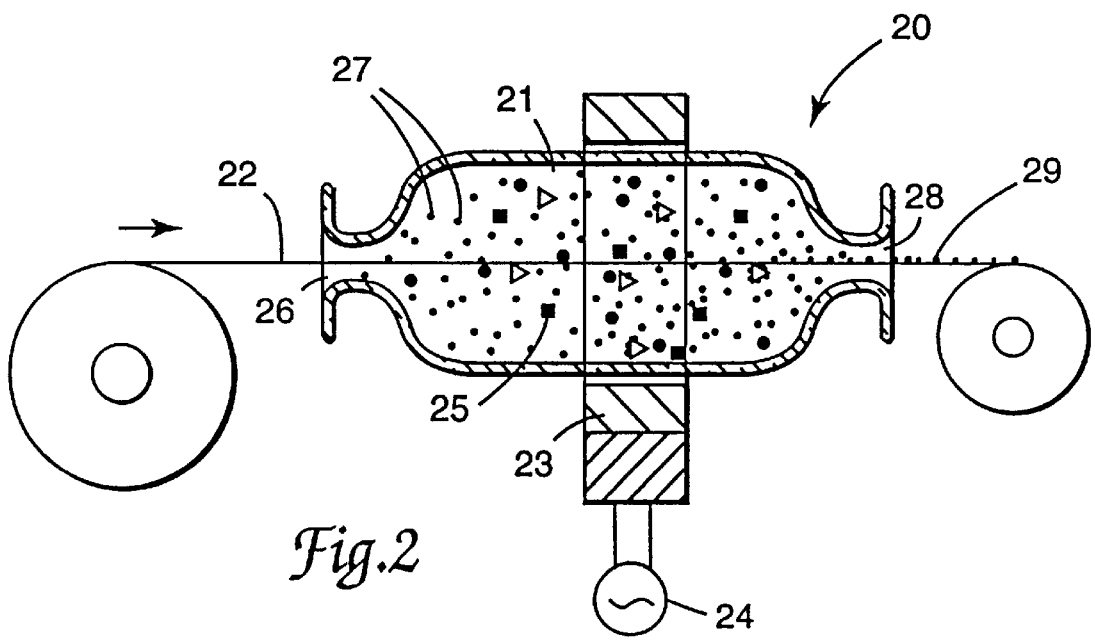
FIG. 2 is a cross-sectional view of another coating system of the present invention.

FIG. 2 shows an alternate embodiment of a device useful in the present invention for coating linear continuous substrates. This coating device 20 includes a coating chamber 21 through which substrate 22 can pass. Coating chamber 21 may be positioned horizontally, vertically or at any position between horizontal and vertical. A C-frame motor stator 23 driven by alternating current power supply 24 provides a magnetic field around coating chamber 21. Magnetic elements 25 are introduced into coating chamber 21 and into the presence of the oscillating magnetic field. Substrate 22 moves from a supply roll through inlet port 26 into coating chamber 21 together with coating material 27 and then after being coated the substrate exits through outlet port 28 onto a take-up roll as coated substrate 29. The configuration of inlet port 27 coating chamber 21 and outlet port 28 depend on the type of substrate being coated. For substrates which are relatively circular in form such as tow, tubing, wire, and the like, the ports are preferably circular and the chamber can be cylindrical or approaching spherical. For substrates which are relatively flat such as films, fabrics, screening and the like, inlet and outlet port can be in the form of slots and the coating chamber can be of a somewhat flatter configuration. The sizes of the ports are preferably such that the magnetic elements, when present, are substantially retained within the chamber.

Coating material 29 which is nonmagnetic in character is introduced into coating chamber 25 as substrate 22 passes through chamber 25 in the magnetic field and the impinging action of the moving magnetic elements 26 peens coating material 29 onto substrate 22. As with the device of FIG. 1, magnetic elements would not be needed when the coating particles are magnetic in nature.

Figure 3:
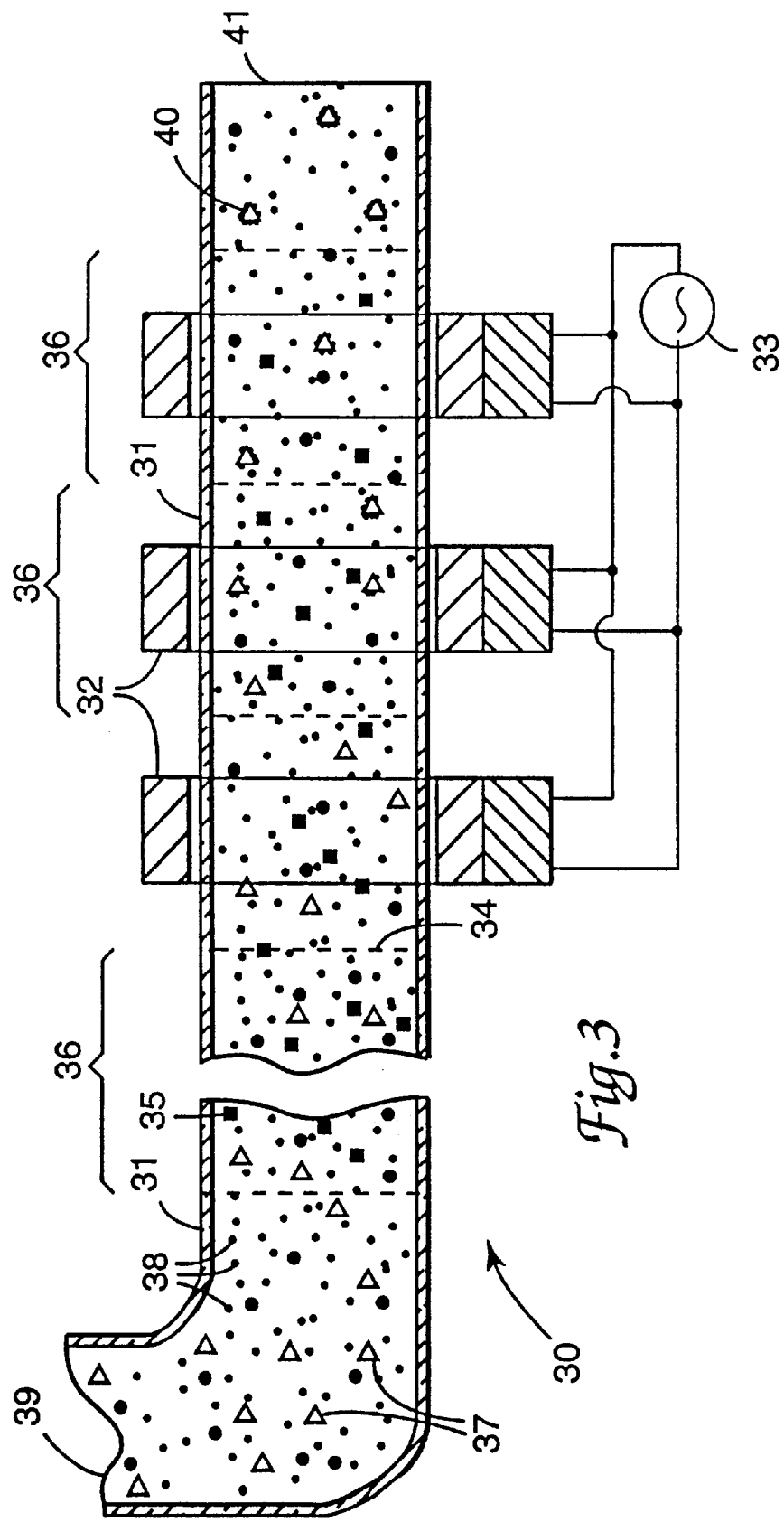
FIG. 3 is a cross-sectional view of another coating system of the present invention.

FIG. 3 shows a device for continuously applying coating materials onto particulate substrates. The device 30 includes tubular reaction chamber 31 around which is placed at least one device for electromagnetically generating a magnetic field such as stators 32 driven by alternating current power supply 33. The reaction chamber 31 can be oriented in a horizontal position, a vertical position or any position between horizontal and vertical. Screens 34 are placed along the length of the reaction chamber 31 with magnetic elements 35 located within each screened section 36. The screens can be made of various materials including polymeric materials, ceramic materials and metal. Preferably the screens are made from stainless steel or nylon. Although eddy currents may form if the screens are made from metal, they do not seem to be strong enough to have a significant effect on the applied oscillating field. Particulate substrate material 37 and coating material 38 are introduced at inlet port 39. When the magnetic field is applied, magnetic elements 35 move and fluidize the particulate substrate material 37 and coating material 38. The magnetic elements impinge upon coating material 38, peening coating material 38 onto substrate 37. The coated particles 40 then leave the reactor at discharge port 41.

By proper selection of the mesh size of the screens 34, the particulate substrate material 37, coating material 38 and the size of magnetic elements 35, the system can be designed such that magnetic elements 35 are retained within each screen section 36, while substrate material 37, coating material 38 and coated particles 40 move easily through the chamber. Reaction chamber vibrating means, not shown, further aid in moving the materials through the chamber. In addition, a mixture of a few large magnet elements among a group of smaller magnetic elements help to prevent screens from plugging if hygroscopic powders are used as the coating material or substrate. Further, it is possible to add a mechanical vibrator to facilitate movement of the particles through the reaction chamber.

Alternatively, such a system can be operated without the screens by feeding the particulate substrate material, the coating material and the magnetic elements into the input port allowing the magnetic elements to impinge on the coating material and peen the coating material onto the substrate material to form coated substrate and separate the magnetic elements from the coated substrate at the discharge port using magnetic separators.

Further alternative embodiments of similar systems which do not utilize screens within the chamber include nontubular chambers such as screw conveyers, Archimedes screws, or zigzag mixers are also useful in practicing the present invention.

Figure 4:
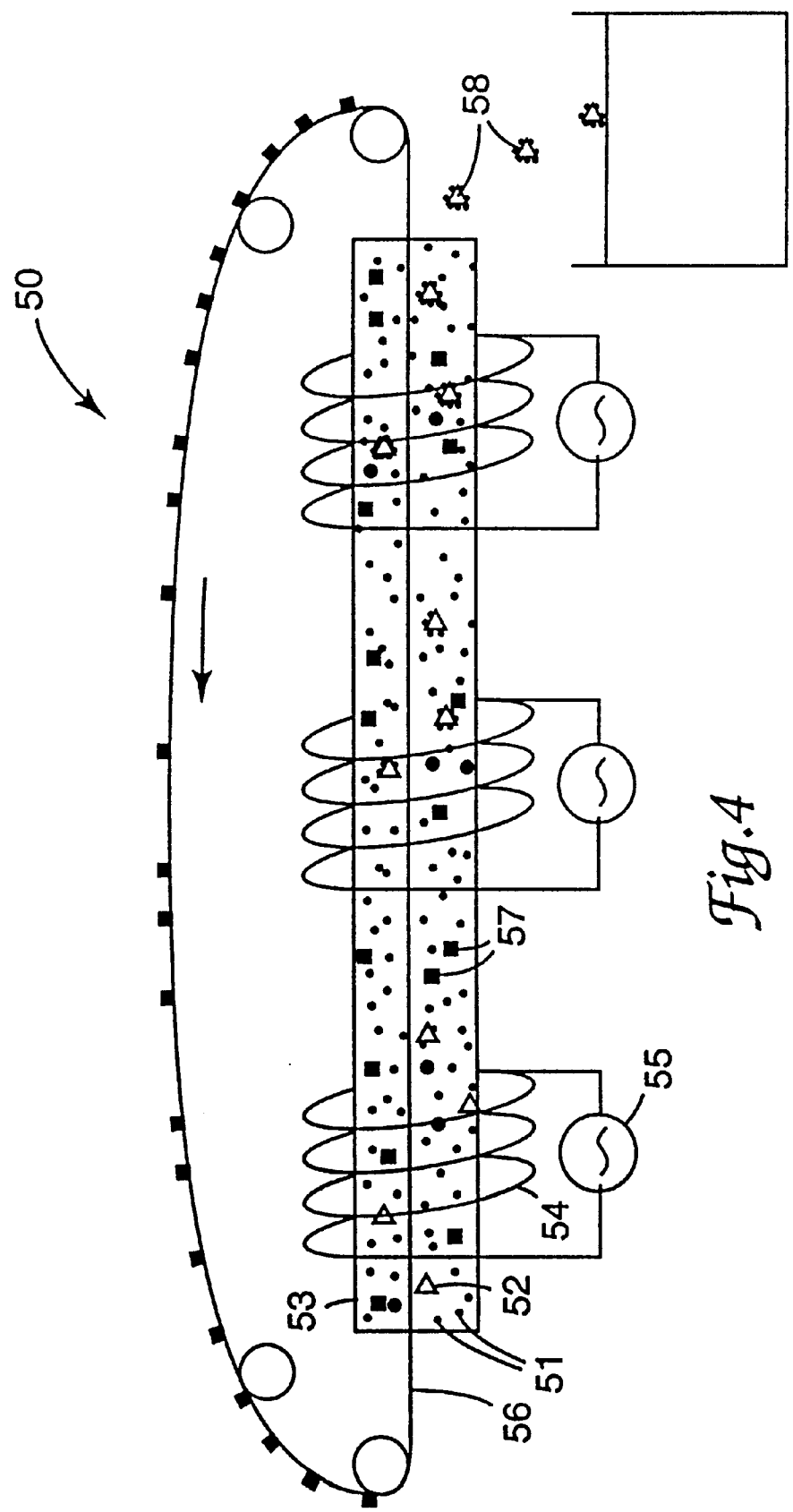
FIG. 4 is a side view of another coating system of the present invention.

FIG. 4 shows a device 50 for continuously applying liquid coating materials 51 Shown as droplets) onto particulate substrates 52 using a reaction chamber 53 which is immersed in the magnetic field generated by electromagnetic field generators 54 such as a coil or coils of conducting wire driven by an alternating current power supplies 55. A continuous flexible magnetic belt 56 passes through reaction chamber 53 at a controlled speed through a region of oscillating magnetic fields and out of the chamber to a region of ambient magnetic fields. Substrate material 52, liquid coating material 51 and magnetic elements 57 are initially continuously fed into the reaction chamber 53. As the substrate material 52, the liquid coating material 51 and the magnetic elements 57 enter the region of oscillating magnetic fields, they become fluidized and the magnetic elements 57 impinge upon liquid coating material 51 and peen coating material 51 or otherwise physically transfer it onto particulate substrates 52. As the magnetic elements 57 and the coated substrates 58 exit the reaction chamber, the coated particles 58 are collected and the magnetic elements adhere to the flexible magnetic belt and are returned to the input port where particulate substrate and liquid coating material are added for conveyance through the reaction chamber and application of the liquid coating material onto the substrates. This type of coating system is particularly useful for coating particulate polymeric substrates which have coherent surfaces.

The above descriptions can be varied depending on the desired results. More than one of the same device can be used in series to increase the amount of material within the liquid that is affixed to a substrate during a given pass. In addition, more than one kind of materials carried by different solutions or dispersions can be affixed, as distinct layers, if the substrate is passed through the process more than one time and the solution is changed between passes. Other variations are also apparent to one skilled in the art.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated. In the examples unless otherwise noted, the magnetic elements were prepared by grinding PLASTIFORM™ B-1030 magnetic material, available from The Arnold Engineering Co., Norfolk, Nebr., and screening the ground material to obtain the desired size. Flowability of certain coated materials prepared according to the invention were tested as follows:

A jar or vial is half filled with a sample of particulate material, held at an angle between 45° and 90° from horizontal, and slowly rotated. If the particulate material is observed to move as clumps, the material is said to have poor flow properties. If the particulate material is observed to move easily, like a liquid, it is said to have good flow properties.

EXAMPLE 1

A magnetic field generator, constructed as shown in FIG. 1, was positioned under a 6 cm wide and 150 µm thick web of polyethylene terephthalate film moving at 1 m/min. The source generated a gradient bipolar magnetic field, oscillating at 60 Hz, that extended through and above the film. Magnetic iron oxide powder, an acicular cobalt modified gamma iron oxide with an average length of about 0.4 µm and an average diameter of about 0.1 µm with a coercivity of 800 oersteds, available from Toda Kogyo Corp., and having sufficient magnetic properties to be fluidized by the oscillating bipolar magnetic field, was fed at 1 mg/min into the oscillating bipolar magnetic field above the moving film. The gradient of the oscillating magnetic field was such that the field confined the magnetic particles in the desired coating region until they impacted the.

Adhesion of the magnetic iron oxide particles to the film surface was determined by visual observation.

EXAMPLES 2-3

A 5% by eight solution of Silube™ MT lubricant (a silicone oil having a triethoxysilane alkyl chain) was coated onto the surface of zinc oxide in the following manner. 300.0 grams of zinc oxide powder and 15.8 grams of the Silube™ MT lubricant were blended using a twin shell V-blender. The zinc oxide particles were at this time highly agglomerated. The mixture of zinc oxide and silicone oil was then added to the 6 inch diameter (15 cm diameter) apparatus of Examples 1–4 with ten 50 mesh supporting screens within the apparatus. Between each pair of screens was 35 grams of BaFe −10, +25 mesh magnets. The magnetic apparatus was run for a sufficient time to assure distribution of the silicone oil over the zinc oxide particles. The material was then heat stabilized at 100° C. for fourteen hours. The zinc oxide displayed greatly increased hydrophobicity after application of the oil.

This example was repeated using 18.0 pounds of zinc oxide and 2.0 pounds of Silube™ MT lubricant in an 18 inch (45 cm) diameter magnetic coating apparatus like that of Example 1 having fourteen 50 mesh screens, each with 200 grams of BaFe −10, +25 mesh magnets. The magnetic apparatus was run for a sufficient time to assure distribution of the silicone oil over the zinc oxide particles. The material was then heat stabilized at 100° C. for ten hours. The zinc oxide displayed greatly increased hydrophobicity after application of the oil.

EXAMPLE 4

Silicone oil was coated over Degussa TS-530 fume silica (silicon dioxide) particles in the following manner. A twenty percent by weight solution of a polydimethylsiloxane silicone oil was blended with a twin sheer V-blender in a 1:10 weight ratio to form a highly agglomerated mixture. This mixture was then added to the 45 cm magnetic coating apparatus of Example 2 using fourteen 50 mesh screens with each screen supporting 200 grams of −10, +25 mesh BaFe magnets. Hydrophobicity of the silica particle was greatly increased.

EXAMPLE 5

Kaolin clay (ASP-170) was blended by hand with an acrylic latex (10% by weight aqueous) solution in a 95:5 ratio of clay:latex. An agglomeration of the kaolin clay particles with the latex was performed in the 15 cm magnetic coater (15 cm screens) with seven 50 mesh screens each carrying 15 grams of BaFe −18, +30 mesh magnets. After mixing by hand and then passing the mixture through the magnetic coater, agglomeration was accomplished without a large increase in average particle size, showing an even distribution of the latex over the kaolin clay particles.

EXAMPLE 6

An example similar to Example 5 was repeated using a Freund granulator spray head inserted into the production line to spray coat the particles with the coating solution. Two magnetic coaters, a first coater with ten 30 mesh screens each having 30 grams of −12, +18 mesh BaFe magnets, and a second having ten 50 mesh screens with 30 grams of −18, +30 mesh BaFe magnets. Kaolin clay was passed through the twin coater system and was sprayed in line, between the coaters with a 3.75% by weight solution of polyvinyl alcohol. The product was agglomerated, showing a mean diameter increase of 5.15 micrometers, with the mean diameter changing from an initial 2.47 micrometers to 7.62 micrometers.

EXAMPLE 7

Mica flakes were coated with a 10% by weight acrylic latex solution with Rose Bengal or Brilliant Blue dye therein. A 15 cm magnetic coater with seven 50 mesh screens therein, each having 30 grams of −18 +30 mesh BaFe magnets was used as the magnetic coater. Multiple runs were made, using various different proportions of mica flakes and latex and dye solutions. materials were preblended by hand then passed twice through the coater. The mica flakes were found to have been coated with the binder/dye solution, with some agglomeration shown.

EXAMPLE 8

TiO2 particles were coated with Silube™ MT lubricant by first mixing the titania and the Silube™ MT lubricant in a V-blender and then introducing the mixture into a 15 cm magnetic coater having ten 50 mesh screens each having 30 grams of −18, +25 BaFe magnets. The resultant silicone oil coated titania particles was more hydrophobic than the raw titania.

EXAMPLE 9

Barium titanate was coated with 1%, 2% and 4% solutions of a triethoxy silane (Durel), first using a V-blender precoating step, followed by the use of the 15 cm magnetic coater having ten 50 mesh magnetic screens, each with 30 grams of −18, +30 BaFe magnets. The hydrophobicity of the particles was greatly increased.

The principles, preferred embodiments, and modes of operation of the present invention have been described herein. The invention is not to be construed as limited to the particular forms disclosed, since these are to be regarded as illustrative rather than restrictive. Variations and changes may be made by those skilled in the art without departing from the spirit of the invention.

What is claimed is:

1. A process for providing a liquid on a particulate substrate, comprising the steps of:
    a) providing an oscillating magnetic field,
    b) introducing into the magnetic field liquid coating material and magnetic particles of from 0.005 to 800 micrometers,
    c) forming a fluidized bed of at least said magnetic particles, and
    d) said liquid coating material coating said magnetic particles.

2. The process of claim 1 wherein the liquid coating material is introduced into said magnetic field after said fluidized bed is formed.

3. The process of claim 2 wherein said non-magnetic particles are added into a chamber where said magnetic field is formed before said fluidized bed is formed in said chamber.

4. The process of claim 3 wherein some of said non-magnetic particles are added into a chamber where said magnetic field is formed after said fluidized bed is formed in said chamber.

5. The process of claim 1 wherein said non-magnetic particles are added into a chamber where said magnetic field is formed before said fluidized bed is formed in said chamber.

6. The process of claim 5 wherein said non-magnetic particles are added into a chamber where said magnetic field is formed after said fluidized bed is formed in said chamber.

7. The process of claim 1 wherein non-magnetic particles in a weight ratio to said magnetic particles of from 0.1:1 to 10:1 are present during said process.

8. The process of claim 7 wherein said non-magnetic particles are added into a chamber where said magnetic field is formed before said fluidized bed is formed in said chamber.

9. The process of claim 8 wherein said non-magnetic particles are added into a chamber where said magnetic field is formed after said fluidized bed is formed in said chamber.

10. The process of claim 7 wherein said non-magnetic particles are added into a chamber where said magnetic field is formed after said fluidized bed is formed in said chamber.

11. The process of claim 10 wherein said substrate particle size is in the range of 0.005 to 500 μm.

12. The process of claim 7 wherein said non-magnetic particulate material is a metallic material, polymeric bead, corn starch, epoxy powder, ceramic particle, metal oxide particle, pigments or glass particle.

13. The process of claim 7 wherein said non-magnetic particle is a hard fracturable material selected from the group consisting of solid glass beads, roofing granules and abrasive particles.

14. The process of claim 13 wherein said abrasive granules are heat treated or fused particles selected from the group consisting of silicon carbide, alumina, zirconia, silica, boron carbide, garnet and combinations thereof.

15. The process of claim 7 wherein said non-magnetic particles are a fragile material selected from hollow glass spheres, aluminum flakes, and mica flakes.

16. The process of claim 7 wherein said non-magnetic particles are selected from the group consisting of silica, titania, silicon carbide and aluminum oxide.

17. The process of claim 7 wherein said magnetic powder is gamma iron oxide, cobalt doped gamma iron oxide, hard barium ferrite, AlNiCo, a rare earth metal or a ceramic.

18. The process of claim 7 wherein said magnetic powder has a size in the range of about 0.05 to 5 μm.

19. The process of claim 7 wherein said coating material size is in the range of 0.005 to 500 μm.

20. The process of claim 1 wherein said oscillating magnetic field has a frequency between about 5 to 1,000,000 hertz.

21. The process of claim 1 wherein the liquid coating material is introduced into said magnetic field before said fluidized bed is formed.

22. The process of claim 21 wherein said non-magnetic particles are added into a chamber where said magnetic field is formed before said fluidized bed is formed in said chamber.

23. The process of claim 22 wherein said non-magnetic particles are added into a chamber where said magnetic field is formed after said fluidized bed is formed in said chamber.

24. The process of claim 1 wherein said non-magnetic particles are added into a chamber where said magnetic field is formed after said fluidized bed is formed in said chamber.

25. The process of claim 21 wherein said non-magnetic particles are added into a chamber where said magnetic field is formed after said fluidized bed is formed in said chamber.

26. The process of claim 1 wherein said non-magnetic particles are added into a chamber where said magnetic field is formed before said fluidize bed is formed in said chamber.

27. The process of claim 1 wherein said magnetic field is supplied with power by oscillators, oscillator/amplifier combinations, solid-state pulsing devices and motor generators.

28. The process of claim 1 wherein said magnetic field is generated by at least one stator powered by an alternating current supply through a transformer.

29. The process of claim 1 wherein said magnetic field has an intensity of between about 100 and 3000 oersteds.

30. The process of claim 1 wherein said liquid coating material comprises a coupling agent.

31. The process of claim 1 wherein said liquid coating material comprises an organic coupling agent selected from the group consisting of silanes and titanates.

32. A process for adhering a liquid to a particulate substrate, the process comprises the steps of:
   a) providing an apparatus which can create an oscillating magnetic field within a chamber, providing particulate magnetic material within the chamber of said apparatus while said oscillating field is active,
   b) having in the chamber within the oscillating magnetic field a liquid coating material and a non-magnetic particles to be coated with said liquid,
   c) and having said magnetic field form a fluidized bed of both said particulate magnetic material and said non-magnetic particles, said liquid coating material coating the surface of at least the non-magnetic particles.

33. The process of claim 32 wherein the particulate magnetic material is added to the chamber before or after the magnetic field has been activated to oscillate.

34. The process of claim 33 wherein said magnetic particles are separated from said non-magnetic particles after step c).

35. The process of claim 34 wherein magnetic particles which have liquid coating material thereon are put into a process comprising the steps of:
   a) providing an apparatus which can create an oscillating magnetic field within a chamber,
   b) providing said magnetic particles which have liquid coating material thereon within the chamber of said apparatus while said oscillating field is active,
   c) having in the chamber within the oscillating magnetic field a liquid coating material and a non-magnetic particles to be coated with said liquid,
   d) and having said magnetic field form a fluidized bed of both said particulate magnetic material and said non-magnetic particles, said liquid coating material coating the surface of at least the non-magnetic particles.

36. The process of claim 32 wherein said liquid coating material comprises a coupling agent.

37. The process of claim 32 wherein said liquid coating material comprises an organic coupling agent selected from the group consisting of silanes and titanates.

38. A process for adhering a liquid to a particle, comprising the steps of:
   a) providing an oscillating magnetic field,
   b) introducing into the magnetic field liquid coating material, non-magnetic particles and magnetic particles of from 0.005 to 800 micrometers,
   c) forming a fluidized bed of at least said magnetic particles,
   d) said liquid coating material coating at least said non-magnetic particles.

39. The process of claim 38 wherein said non-magnetic particles have a number average diameter of from 0.05 to 100 micrometers, and said magnetic particles have a number average diameter of from 0.05 to 5.0 micrometers.

40. The process of claim 39 wherein after said non-magnetic particles have been coated by said liquid, said magnetic particles are separated from said non-magnetic particles.

* * * * *